Oct. 30, 1951 D. A. SCHROCK 2,573,654
APPARATUS FOR THERMOCHEMICALLY CUTTING GEARS
Filed May 4, 1949 3 Sheets-Sheet 1

Inventor
Daniel A. Schrock

Oct. 30, 1951  D. A. SCHROCK  2,573,654
APPARATUS FOR THERMOCHEMICALLY CUTTING GEARS
Filed May 4, 1949  3 Sheets-Sheet 2

MAXIMUM ORBITAL & MINIMUM RADIAL TRAVEL OF TORCH

MAXIMUM RADIAL & MINIMUM ORBITAL TRAVEL OF TORCH

Inventor
Daniel A. Schrock
By Clarence A. O'Brien
and Harvey B. Jacobson
Attorneys Oct. 30, 1951  D. A. SCHROCK  2,573,654
APPARATUS FOR THERMOCHEMICALLY CUTTING GEARS
Filed May 4, 1949  3 Sheets-Sheet 3

Inventor
Daniel A. Schrock

By *Clarence A. O'Brien
and Harvey B. Jacobson*
Attorneys

UNITED STATES PATENT OFFICE 2,573,654

APPARATUS FOR THERMOCHEMICALLY CUTTING GEARS

Daniel A. Schrock, Boise, Idaho, assignor to Idaho Sprocket and Machine Works, Boise, Idaho, a copartnership Application May 4, 1949, Serial No. 91,326

1 Claim. (Cl. 266—23)

This invention comprises novel and useful improvements in an apparatus for thermochemical cuttings and more specifically pertains to an improved apparatus for cutting sprocket gears from sheet metal material.

The principal object of this invention is to provide an improved apparatus for thermochemically cutting sprocket gears from sheet metal material.

A very important object of the invention is to provide an apparatus wherein the cutting torch is caused to follow with exactness and precision a predetermined path of travel and is moved at varying speeds throughout this path of travel for cutting sprocket gears.

A still further object of the invention is to provide an improved apparatus for cutting sprocket gears from sheet metal which will obviate the necessity for causing the cutting torch to follow a template or pattern with the resultant lost motion necessitating a tolerance in the final dimensions of the finished gear, whereby a gear of a predetermined contour may be cut with exactness and accuracy and with a precision which eliminates the necessity for additional machining and finishing operations upon the gear.

A still further object of the invention is to provide an improved apparatus for cutting sprocket gears from sheet metal material wherein the thermochemical cutting torch is caused to move at varying linear speeds as the same is moved through a path of predetermined shape while cutting gears, to thereby obtain maximum efficient cutting speed of the torch with a complete obviation of the danger of undue heating, warping or burning the gear cut, and wherein the action of the cutting torch also serves to temper the gear whereby a sprocket gear is produced in one operation which is cut to exact dimensions without the necessity for an additional tempering operation thereon.

Yet another object of the invention is to provide an apparatus which is adapted to readily cut sprocket gears of any desired number of teeth and of any desired contour of gear tooth with a maximum ease of adjustment of the apparatus and manipulation of the same.

The present invention relates to a similar apparatus to that set forth in my co-pending applications Ser. No. 3,116 filed January 19, 1948 and Ser. No. 731,249 filed February 27, 1947, now Patent No. 2,489,201, issued November 22, 1949, and the present application is therefore a continuation in part of these two previously mentioned applications. Various ancillary objects and features of the invention are attained by the present invention, a preferred embodiment of which has been illustrated by way of example only in the accompanying drawings, wherein.

For realizing the purposes of this invention, an apparatus is provided to support an oxy-acetylene cutting torch and to impart both a circular motion about and a movement radially of a fixed axis of rotation. The circular or arcuate motion about the fixed axis constitutes the orbital component of the path of travel of the torch and is most instrumental in forming the teeth crowns and roots of sprocket gears being cut by this invention. The rectilinear motion of the torch along a radius of the axis of rotation of the torch forms the radial component of the torch path of travel and is chiefly instrumental in shaping the flanks and sloping surfaces of the gear teeth being cut. It is these two motion components which are designated by the terms orbital and radial.

Figure 1:
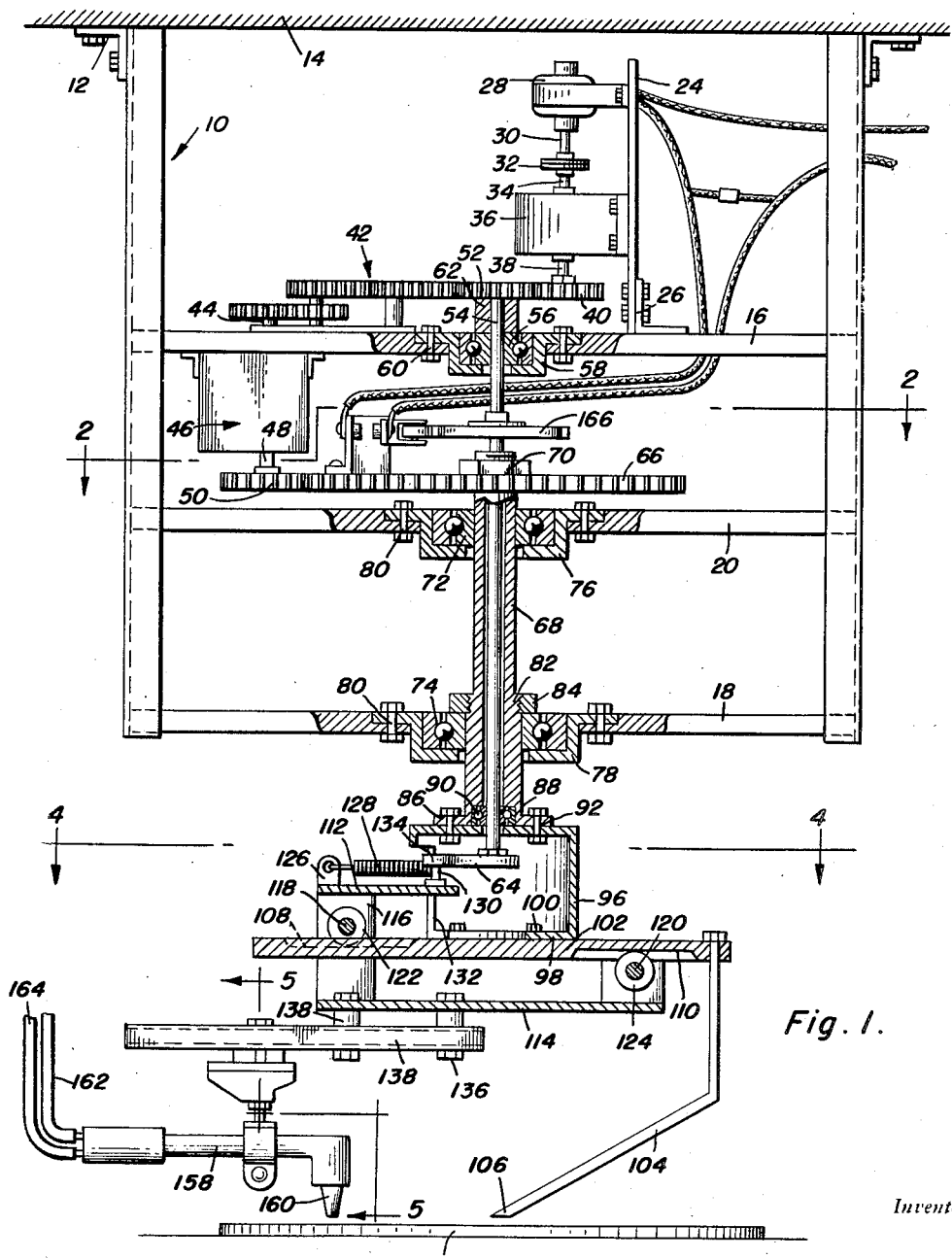
Figure 1 is a side elevational view, parts being broken away and shown in section, of a satisfactory apparatus for practicing the principles of this invention.
Figure 2:
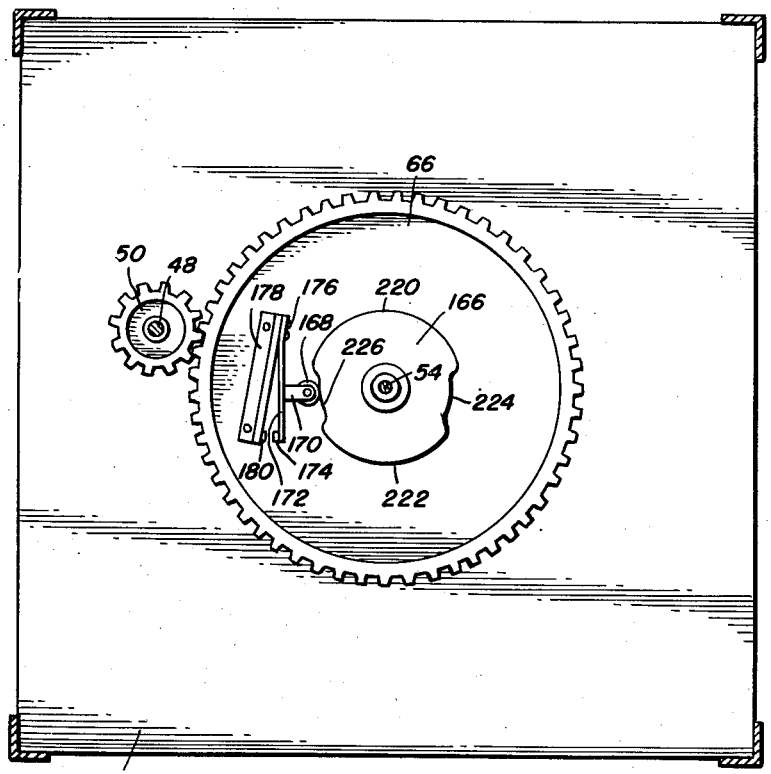
Figure 2 is a horizontal sectional view taken substantially upon the plane of the section line 2—2 of Figure 1 and showing the rheostat switch for varying the linear speed of travel of the cutting torch.

Referring more specifically to the accompanying drawings, wherein like numerals designate similar parts throughout the various views, attention is directed primarily to Figure 1 wherein the numeral 10 generally identifies a supporting frame which is shown as mounted by brackets 12 from a ceiling 14 or other suitable horizontal supporting surface. This frame may conveniently include an upper platform 16, a lower platform 18, and an intermediate platform 20 upon which the various elements of the apparatus are mounted.

The present invention contemplates the mounting of a sheet metal blank 22, or a piece of sheet metal material from which a sprocket gear is to be cut, upon any suitable support not shown whereby the blank will be held stationary in proper position while the cutting torch moves thereover along a predetermined path of travel to form a sprocket gear of any desired contour from the blank 22.

Mounted in a convenient location, as upon a vertical supporting plate 24 carried by the upper platform 16 through the agency of a bracket 26, is a prime mover such as an electric motor 28, having a vertically disposed armature shaft 30 which is connected as by a detachable coupling 32 to the vertically disposed input shaft 34 of a reduction gearing assembly housed in a casing 36, which reduction gearing assembly is of any desired or known construction, and has provided therewith an output shaft 38 having a driving spur gear 40 thereon.

The spur gear 40 constitutes the driving gear of a gear assembly indicated generally by the numeral 42, which gearing assembly drives a vertically disposed shaft 44 extending into a change speed gearing assembly indicated generally by the numeral 46, preferably supported below the platform 16, which may be of any known manually actuable construction, and is capable of transmitting power from the input shaft 44 to the output shaft 48 and the output driving gear 50 at various selected speed ratios.

The gearing assembly 42 includes a gear 52 which is mounted upon the upper end of a vertical shaft 54, the latter being journalled in a bearing assembly 56 carried by a cup-shaped bearing cage or retainer 58 secured to the upper platform 16 and extending through an aperture as by fastening bolts 60.

Figure 4:
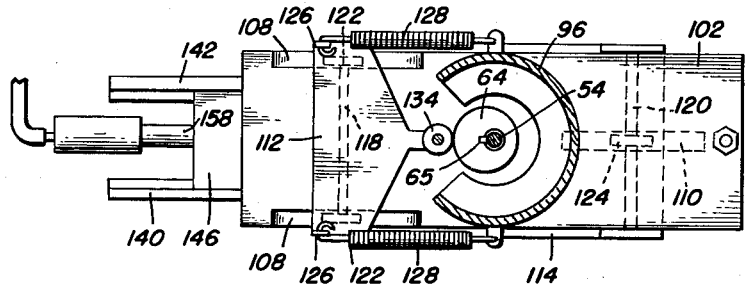
Figure 4 is a horizontal sectional view taken substantially upon the plane of the section line 4—4 of Figure 1.

A suitable spacing collar or sleeve 62 surrounds the shaft 54 and rests upon the bearing assembly 56, to thereby position the gear 52 above the platform 16 in mesh with the driving gear 40 and the gearing assembly 42, and thus support the shaft 54. As will be seen from Figure 1, the shaft 54 extends beneath the frame 10 and at its lower extremity is provided with a cam or eccentric 64, keyed as at 65 so that it will be received upon the shaft 54 only in proper position, as shown more clearly in Figure 4. This eccentric or cam 64 constitutes means for imparting a radial movement to the torch to thus determine the depth of the teeth to be cut upon the gear.

The gear 50 constitutes the driving gear for a large driven gear 66, which driven gear is secured to the upper extremity of a sleeve 68 as by a fastening nut 70 secured to the screw-threaded upper end of the sleeve. This sleeve loosely surrounds the above mentioned shaft 54, and is journalled at its upper and lower portions in anti-friction bearing assemblies 72 and 74 which respectively are received in bearing seats or cages 76 and 78 detachably secured as by bolts 80 in the intermediate and lower platforms 20 and 18 respectively. Adjacent its lower end, the sleeve 68 has a screw-threaded portion 82 which receives an adjusting nut 84 by means of which the sleeve is supported upon the bearing assembly 74.

At its lower end, the sleeve is provided with a diametrically enlarged flange-like portion 86, within which is provided an axial recess 88 receiving an anti-friction bearing assembly 90 by which the lower end of the shaft 54 is journalled in the lower end of the sleeve 68. Likewise mounted upon the flange 86 as by fastening bolts 92, is a housing 96, whose bottom surface 98 detachably supports as by fastening bolts 100, a carriage 102. This carriage 102 is thus detachably but rigidly supported by the housing 96 and rotates with the sleeve 68 through the previously described gearing assemblies.

A pointer 104 is mounted on the carriage 102, and has its lower extremity 106 disposed in axial alignment with the axis of rotation of the sleeve 68 and shaft 54, and positioned to be spaced slightly above the work piece 22, to provide a means for centering the work with respect to the axis of rotation of the apparatus. The carriage 102 is provided upon its upper and lower surfaces with diametrically and oppositely disposed guideways in the form of channels or grooves 108 and 110 respectively. A torch support consisting of an upper plate 112 and a lower plate 114, rigidly united as by side plates 116, is provided with horizontal axles 118 and 120 having guide rolls 122 and 124 thereon which respectively roll in the guideways 108 and 110. Thus, the torch support is mounted upon the carriage 102 for diametrical reciprocative movement hereon, and is rotated with the carriage.

The upper plate has upstanding lugs 126, and tension springs 128 are terminally secured to these lugs and to any suitable portion of the housing 96 to yieldingly bias or urge the torch support along a diameter of the axis of rotation of the concentric shaft 54 and sleeve 68. Journalled upon a vertical stub axle 130 upon an end portion of a top plate 112 which extends into an opened side 132 of the housing 96, is a roll 134 which constitutes a cam follower engaging the cam or eccentric 64 for actuation thereby.

Figure 5:
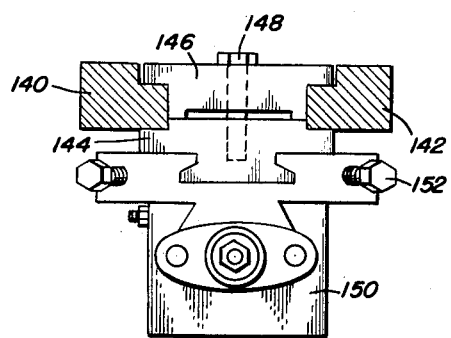
Figure 5 is a vertical transverse sectional view taken substantially upon the plane of the broken section line 5—5 of Figure 1; and, Figure 6 is a diagrammatic view of an electric circuit for operating the apparatus.

Mounted beneath the lower plate 114 as by fasteners 136 and spacers 137, is a horizontally extending arm 138 which is disposed radially of the axis of rotation of the shaft and sleeve 54 and 68. This arm 138 is provided with a longitudinal slot or channel therebetween, and for this purpose the arm may conveniently be composed of a pair of angle irons 140 and 142, see Figure 5, upon and between which are slidably disposed lower and upper clamping blocks 144 and 146 engaging the lower and upper surfaces of the channel or angle iron members, which blocks may be clamped in adjusted position as by a clamping bolt 148. The lower block 144 has a dove-tailed channel sliding connection by means of which is supported a block 150, which may be locked in selected positions thereon as by adjusting screws 152, this block having a screw-threaded depending portion 154 by means of which is supported a clamp 156 which carries a cutting torch 158 having a nozzle 160. This torch is provided with flexible conduits 162 and 164 by means of which the combustion gases are supplied to the torch under suitable controls and in a known and conventional manner.

It will thus be seen that the entire torch assembly is mounted upon the lower plate 114 of the support for movement and adjustment radially with respect to the axis of rotation of the shaft 54 and sleeve 68.

As so far described, it will be seen that the power source 28 through the gearing assembly 52, variable speed transmission 46 and gears 50 and 66, will impart rotation to the sleeve 68, to the housing 96 and to the carriage 102 carried thereby, whereby the torch 158, with its nozzle 160 will be given an orbital movement about the axis of rotation of the sleeve 68, and at a radius which may be adjusted both by adjusting the clamping blocks 144 and 146 and by adjusting the block 150 upon the block 144.

This mechanism is thus capable of causing the torch 160 to describe concentric circles of adjustable radius about the axis of rotation of the sleeve 68.

However, a regulated radial movement of the torch simultaneously with the orbital movement thereof is effected by means of the mechanism associated with the shaft 54. For this purpose, the gear 52 of the gear train 42 rotates the shaft 54 at a fixed speed ratio compared to the driving gear 40, and the gear train 42, to thereby impart a radial reciprocating motion to the torch support by means of the cam or eccentric 64, the cam follower 134 and the support rollers 122 and 124 in their guide channels 108 and 110. As will be seen, this radial movement of the torch assembly upon the rotating carriage 102 is in timed relation to the rotation of this carriage, which timed relation can be varied by properly adjusting the change speed gearing 46.

It will be thus seen that the torch is given a compound orbital or circular motion with an intermittent but timed and adjustable radial reciprocation, so that a sinuous or undulating path of the cutting nozzle of the torch relative to the orbital path of travel is effected during rotation of the torch about the axis of the shaft 54 and sleeve 68.

Obviously, by properly shaping or contouring the cam or eccentric 64, the radial movement of the torch may be so adjusted and regulated as to bear any desired relation to the orbital travel of the same, so that various contours of sprocket gear teeth may be cut as the torch moves in a generally circular path about the work piece 22.

It is contemplated that the cam 64 may be replaced by cams of different contours in order to enable the apparatus to thermochemically cut sprocket gears of different dimensions and proportions. This interchangeability of cams is easily effected since it is merely necessary to move the torch support to its outermost position with respect to the cam 64, and then remove the cam from the lower end of the shaft 54, there being ample room in the housing 96 through the opening 132 for effecting this interchanging of the cams.

When a sheet metal plate is cut by a torch, it is desirable to maintain the maximum speed of travel of the torch with respect to the plate which will produce a satisfactory article, in the interest of economy. Where rectilinear cuts and cuts of a constant radius of curvature are being formed the linear speed of travel of the torch over the work piece may be a constant. But if a constant linear speed of torch travel is utilized for cutting gears, a large number of rejects or defective articles usually occurs.

This undesirable condition arises from the fact that a given area of the work surface of the blank is exposed to the heat of the torch for different periods of time depending upon the shape of the torch path of travel. Where the radius of curvature of the torch travel upon the blank is great and the linear speed of the torch on the blank is constant the area is exposed to the heat for a less time than where the radius is small. For the crown portions and roots of the teeth, this radius of curvature is less than for the flanks. Consequently if the maximum cutting speed is employed for the flank portions, the root and crown portions will be unduly heated, resulting in warping or burning of the gear blank being cut.

If the linear speed of travel is increased sufficiently to avoid burning or warping of the gear blank at the crown and root portions, the flank portions are usually underheated thus causing a rough cut lacking in precision of contour.

The present invention overcomes these difficulties by varying the linear speed of travel of the torch to employ the optimum cutting speed for each portion of the path of travel of the torch, the hereinafter described mechanism being suitable for this purpose.

Secured to the shaft 54 in any suitable manner is a cam 166 which is engaged by a roller 168 journalled on an arm 170 carried by a movable switch blade 172, having a movable switch contact 174. The blade 172 is rigidly secured as at 176 to one end of a fixed arm 178, having a fixed switch contact 180, the arm 178 being mounted upon the driven gear 66 for rotation therewith. The switch contacts 174 and 180 are so connected to the electric circuit of the motor 28 as to control and vary the speed thereof.

Figure 6:
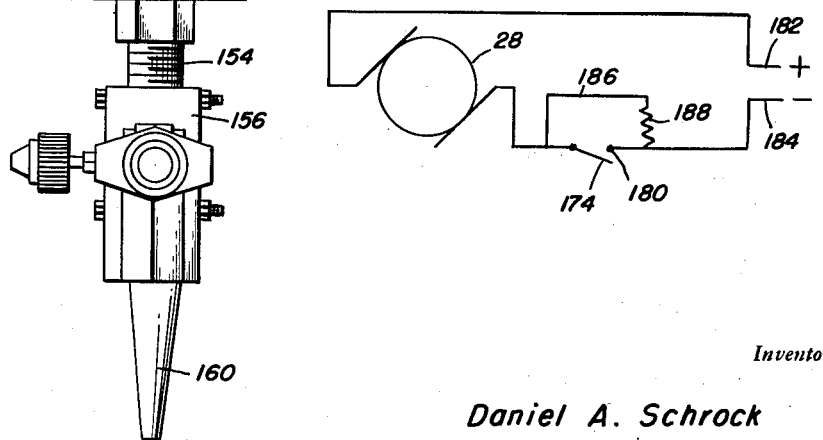

A suitable electric circuit is indicated diagrammatically in Figure 6, certain of the connections being shown in Figure 1. This circuit includes a live conducting lead 182 and a return or ground lead 184, leading from any suitable source of electric current and connecting with the brushes of the electric motor 28. One of the leads such as that at 184, has inserted therein a switch having the fixed contact 180 and the movable contact 174, while a by-pass conductor 186 is provided with a rheostat 188 to by-pass the switch contacts. It will thus be seen that when the switch contacts 174 and 180 are open, the motor will be driven at a constant speed by current through the conductor 182, through the by-pass 186, rheostat 188 and return lead 184. However, when the switch contacts 174 and 180 are closed by actuation of the cam and follower 166 and 168, the resistance 188 is cut out of the motor circuit, whereby the motor is speeded up momentarily. As will be seen, this increase in speed results in an acceleration of both the circular movement or orbital travel of the torch by means of increased rotation of the sleeve 68, as well as in an acceleration of the radial component of the torch travel by means of an increase in speed of the shaft 54 through the associated gearing assemblies of these two members.

It is intended that what may be termed a normal linear speed of travel of the torch, during its compounded orbital and radial motion components, may be adjusted to any desired rate by properly choosing the gearing assemblies 42, 36, by adjusting the transmission 46, and by choosing the gear ratios of the gears 50 and 66. Also any desired accelerated movement may be imparted to the torch by properly choosing and selecting the resistance of the rheostat 188 to thereby produce any desired augmentation of the motor speed. It is contemplated that both the normal speed and the augmented or accelerated speed will be selected in accordance with the requirements of the work, this varying with the material, the type of gear, and the like. In any event, however it is intended and is an essential part of this invention that the linear speed of travel of the torch upon the work blank throughout its sinuous path of travel in cutting a sprocket gear, shall at all times be at the optimum and the most efficient linear cutting speed of the torch. Thus, a slower linear speed of travel of the torch over the work should be employed for movement in the orbital path of travel than is employed with the torch moving along sharp curves of relatively small radius, since in the latter situation the area heated by the cutting flame moving about a center on a short radius includes a greater length of the path of travel of the torch upon the work, and thereby a given area is heated by the torch for a longer period, than when the torch moves on the orbital portion of its path. Therefore the present invention provides means for varying the linear speed of travel of the torch so that the surface of the work piece will not be unduly heated by prolonged exposure of the same to the torch when arcs of relatively short radii are being cut by the torch.

Not only does the varied speed of travel of the torch in conformity with the contour of its path of travel produce more even and more efficient cutting of a gear blank, but the same further results in uniformly heat treating the blank during the gear forming operation so as to effectively temper and anneal the same. For this purpose, characteristics of the flame produced by the torch may be properly adjusted to produce the desired optimum cutting and most efficient tempering, annealing and heat treating flame; and if desired the torch may be provided with an additional nozzle for producing and augmenting this heat treatment as by additionally chilling by an air blast the cut portion of the blank.

Figure 3:
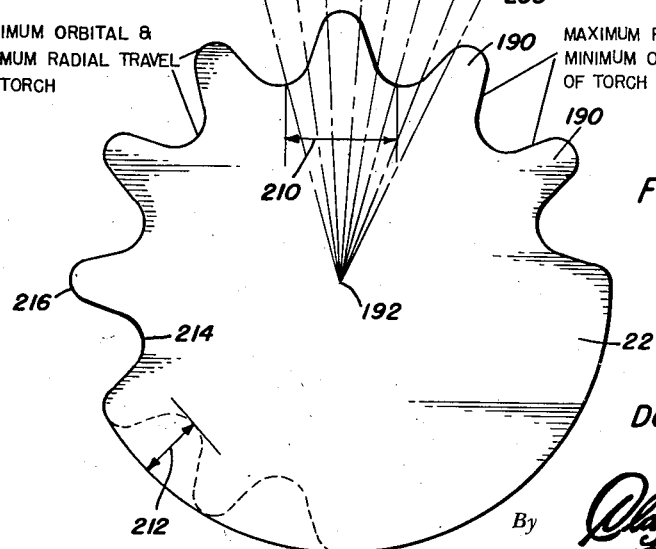
Figure 3 is a diagrammatic view depicting the operation of the cutting torch in thermochemically cutting a sprocket gear from a gear blank.

Attention is next directed to the diagrammatic view of Figure 3 wherein 22 designates a gear blank which is to be cut in the form of a sprocket gear having a plurality of gear teeth 190. The center of the gear blank and of the sprocket gear is indicated at 192, this point being indicated by the pointer 106 of the arm 104 shown in Figure 1.

The radii 194, 196, 198, 200, 202, 204, 206, and 208 are disposed at equal angular intervals from the center 192, and the radii 194, 204 define therebetween the profile or contour of one complete gear tooth. From the diagram of Figure 3 it will be seen that as the torch rotates through these equal angular intervals defined by the radii, the linear travel of the torch over the gear blank covers unequal distances as shown by the comparison of the length of torch travel on the slope or profile of the tooth with reference to the equal angular intervals between the radii. The distance 210 represents the width or lateral dimension of the root of the tooth, and the distance 212 indicates the difference in radii between the base and addenda circles of the tooth or the actual depth of the tooth.

It will now be seen that if the cutting torch moves at a constant linear reciprocating speed during the constant rotational speed of the torch, that the relatively short linear distance of torch travel on the work between the radii 194 and 196, 202 and 204, 204 and 206, 198 and 200, would be subjected to the heat of the torch for a greater length of time than that portion of the tooth lying between the radii 196 and 198 and between 200 and 202. It is therefore necessary that in order to obtain the most effective speed of movement of the torch over the blank 22 throughout the entire sinuous travel of the torch in following or cutting the profile of the teeth of the sprocket gear, the linear rate of travel of the torch upon the sharply curved base and crown portions of the tooth be accelerated.

This selected and varying control of the speed of the torch is effected by properly proportioning the cam 166, so that the radially outward portions or lobes 220 and 222 which will close the switch and thereby by-pass the rheostat 188, permitting the linear speed of the torch to increase, will be synchronized with the portion of the tooth being cut so that this increased speed of travel of the torch will occur at the relatively sharply curved root and crown portions 214 and 216 respectively of each tooth, while the radially recessed portions 224 and 226 of the cam will permit the switch to open thereby reinserting the rheostat in the motor circuit and thereby slowing down the motor as the torch cuts the flank portions of the tooth as between the radii 196 and 198 and the radii 200 and 202.

It will be understood that the invention contemplates the use of interchangeable cams 166 whose profile will be of such proportion as to adjust the radial speed of the torch relative to the constant orbital speed to the actual contour or pattern of each tooth 190 to be cut. The actual movement of the torch both orbitally and radially in unison to obtain the desired tooth pattern will of course be effected by the use of interchangeable cams 64, which will thus give the desired relative orbital travel and radial component of travel to the torch. Likewise, the size of the interchangeable cam 64 will determine the pitch of the gear to be cut, while proper manipulation of the change speed gearing 46, will vary the number of complete radial reciprocations of the torch throughout one rotation of the same, and thereby will determine the number of teeth to be cut upon a gear of a given diameter.

It will be apparent that the apparatus contemplates a constant or fixed rate of rotation or orbital movement during the cutting of a gear, with a cyclically variable rate of radial travel of the torch; and that the compounded motions produces an intermittent variation in the linear torch speed which produces uniform cutting and uniform heat treating simultaneously therewith.

From the foregoing, the construction and operation of the apparatus hereinbefore disclosed to the cutting of sprocket gears thermochemically will be evident and further explanation is believed to be unnecessary.

However, since numerous changes will readily occur to those skilled in the art after a consideration of the foregoing specification and accompanying drawings, it is not desired to limit the invention to the exact construction shown and described, but all suitable modifications in the apparatus may be resorted to, falling within the scope of the appended claim.

Having described the invention, what is claimed as new is:

An apparatus for forming a sprocket gear from a flat gear blank comprising a torch, means for mounting a flat gear blank in operative cutting relation to said torch, means for imparting orbital movement to said torch about an axis of rotation, means for imparting to said torch movement radially of said axis of rotation in synchronization with said orbital movement, means for increasing the linear speed of travel of the torch over those portions of the gear blank where the path of travel of the torch has a smaller radius of curvature, said torch moving means including an electric motor and circuit therefor, said last means including a resistance in said motor circuit, a switch controlling the operativeness of the resistance in said motor circuit and mounted on said means for imparting orbital movement to said torch, said switch having a fixed member and a movable arm with complementary switch contacts thereon, cam actuated means fixedly mounted on said movable arm for closing said switch contacts to remove the resistance from the motor circuit, a cam actuating said cam actuated means, said cam being mounted upon said means for imparting radial movement to said torch.

DANIEL A. SCHROCK.

REFERENCES CITED

The following references are of record in the file of this patent:

UNITED STATES PATENTS

| Number | Name | Date |
|---|---|---|
| 2,051,915 | Sykes | Aug. 25, 1936 |
| 2,089,014 | Bucknam et al. | Aug. 3, 1937 |
| 2,142,436 | Clabeaux | Jan. 3, 1939 |
| 2,189,140 | Glaum, Jr. | Feb. 6, 1940 |
| 2,190,360 | Howard | Feb. 13, 1940 |
| 2,208,212 | Crowe | July 16, 1940 |
| 2,326,840 | Day | Aug. 17, 1943 |
| 2,378,017 | Hubkey | June 12, 1945 |
| 2,382,515 | Smith | Aug. 14, 1945 |
| 2,383,607 | Lovers et al. | Aug. 28, 1945 |
| 2,425,751 | McGuire | Aug. 19, 1947 |
| 2,464,351 | Shorter | Mar. 15, 1949 |
| 2,489,201 | Schrock | Nov. 22, 1949 |

FOREIGN PATENTS

| Number | Country | Date |
|---|---|---|
| 417,236 | Germany | Aug. 8, 1925 |
| 561,586 | Great Britain | May 25, 1944 |
| 566,249 | Great Britain | Dec. 20, 1944 |

OTHER REFERENCES

Critchett: Treatise in Metal Progress, December 1933, pages 29, 30 (complete article pages 28–31).

Lippert: Treatise in The Iron Age, August 8, 1935, page 13 (complete article pages 12–17 and 95).